United States Patent
Eickemeyer et al.

(10) Patent No.: US 10,664,279 B2
(45) Date of Patent: *May 26, 2020

(54) INSTRUCTION PREFETCHING IN A COMPUTER PROCESSOR USING A PREFETCH PREDICTION VECTOR

(71) Applicant: International Business Machines Corporation, Armonk, NY (US)

(72) Inventors: Richard J. Eickemeyer, Rochester, MN (US); Sheldon Levenstein, Austin, TX (US); David S. Levitan, Austin, TX (US); Mauricio J. Serrano, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/239,766

(22) Filed: Jan. 4, 2019

(65) Prior Publication Data

US 2019/0138312 A1 May 9, 2019

Related U.S. Application Data

(63) Continuation of application No. 15/072,717, filed on Mar. 17, 2016, now Pat. No. 10,175,987.

(51) Int. Cl.
*G06F 9/38* (2018.01)
*G06F 12/0891* (2016.01)
(Continued)

(52) U.S. Cl.
CPC .......... *G06F 9/3802* (2013.01); *G06F 9/3891* (2013.01); *G06F 12/0862* (2013.01); *G06F 12/0875* (2013.01); *G06F 12/0891* (2013.01); *G06F 2212/452* (2013.01); *G06F 2212/6026* (2013.01)

(58) Field of Classification Search
CPC .................................................... G06F 9/3802
See application file for complete search history.

(56) References Cited

U.S. PATENT DOCUMENTS

| 7,890,702 B2 | 2/2011 | Lauterbach |
| 7,917,731 B2 | 3/2011 | Stempel et al. |

(Continued)

OTHER PUBLICATIONS

Cilku et al., "A Time-Predictable Instruction-Cache Architecture that Uses Prefetching and Cache Locking", Object/Component/Service-Oriented Real-Time Distributed Computing Workshops (ISORCW), 2015 IEEE 18th International Symposium (online), DOI: 10.1109/ISORCW.2015.58, dated Apr. 13-17, 2015, 6 pages, Auckland.

(Continued)

*Primary Examiner* — Michael J Metzger
(74) *Attorney, Agent, or Firm* — Nathan M. Rau

(57) ABSTRACT

Instruction prefetching in a computer processor includes, upon a miss in an instruction cache for an instruction cache line: retrieving, for the instruction cache line, a prefetch prediction vector, the prefetch prediction vector representing one or more cache lines of a set of contiguous instruction cache lines following the instruction cache line to prefetch from backing memory; and prefetching, from backing memory into the instruction cache, the instruction cache lines indicated by the prefetch prediction vector.

18 Claims, 7 Drawing Sheets

(51) Int. Cl.
*G06F 12/0875* (2016.01)
*G06F 12/0862* (2016.01)

(56) References Cited

U.S. PATENT DOCUMENTS

| | | | |
|---|---|---|---|
| 7,975,108 B1 * | 7/2011 | Holscher | G06F 12/0862 711/118 |
| 8,060,701 B2 * | 11/2011 | Morrow | G06F 12/0862 711/137 |
| 8,433,853 B2 | 4/2013 | Eddy et al. | |
| 8,533,422 B2 * | 9/2013 | Subramaniam | G06F 9/3816 711/105 |
| 8,683,132 B1 | 3/2014 | Danilak | |
| 8,966,186 B2 | 2/2015 | Prasky et al. | |
| 9,026,739 B2 | 5/2015 | Manne et al. | |
| 9,032,159 B2 | 5/2015 | Ramani-Augustin et al. | |
| 2004/0123044 A1 * | 6/2004 | Franaszek | G06F 12/0862 711/137 |
| 2005/0268046 A1 * | 12/2005 | Heil | G06F 12/0862 711/137 |
| 2014/0082286 A1 * | 3/2014 | Chou | G06F 12/0862 711/122 |
| 2014/0195772 A1 | 7/2014 | McCormick, Jr. | |
| 2014/0208039 A1 | 7/2014 | Gilbert | |
| 2014/0229682 A1 | 8/2014 | Poremba et al. | |
| 2017/0269937 A1 | 9/2017 | Eickemeyer et al. | |

OTHER PUBLICATIONS

Awad et al., "STM: Cloning the Spatial and Temporal Memory Access Behavior", High Performance Computer Architecture (HPCA), 2014 IEEE 20th International Symposium (online), DOI: 10.1109/HPCA.2014.6835935, dated Feb. 15-19, 2014, 11 pages, Orlando, FL.

Bhatia et al., "Sequential Prefetch Cache Sizing for Maximal Hit Rate", Modeling, Analysis & Simulation of Computer and Telecommunication Systems (MASCOTS), 2010 18th Annual IEEE/ACM International Symposium (online), DOI: 10.1109/MASCOTS.2010.18, dated Apr. 17-19, 2010, 10 pages, Miami Beach, FL.

Appendix P; List of IBM Patent or Applications Treated as Related, Jan. 4, 2019, 2 pages.

* cited by examiner

(12) United States Patent

US 10,664,279 B2

INSTRUCTION PREFETCHING IN A COMPUTER PROCESSOR USING A PREFETCH PREDICTION VECTOR

CROSS-REFERENCE TO RELATED APPLICATION

This application is a continuation application of and claims priority from U.S. patent application Ser. No. 15/072,717, filed Mar. 17, 2016.

BACKGROUND

Field of the Invention

The field of the invention is data processing, or, more specifically, methods and apparatus for instruction prefetching in a computer processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors. Prefetching of instruction for later use is one form of increasing speed of operation in computer processors.

SUMMARY

Methods and apparatus for instruction prefetching in a computer processor are disclosed in this specification. Such instruction prefetching may include, upon a miss in an instruction cache for an instruction cache line: retrieving, for the instruction cache line, a prefetch prediction vector, the prefetch prediction vector representing one or more cache lines of a set of contiguous instruction cache lines following the instruction cache line to prefetch from backing memory; and prefetching, from backing memory into the instruction cache, the instruction cache lines indicated by the prefetch prediction vector.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
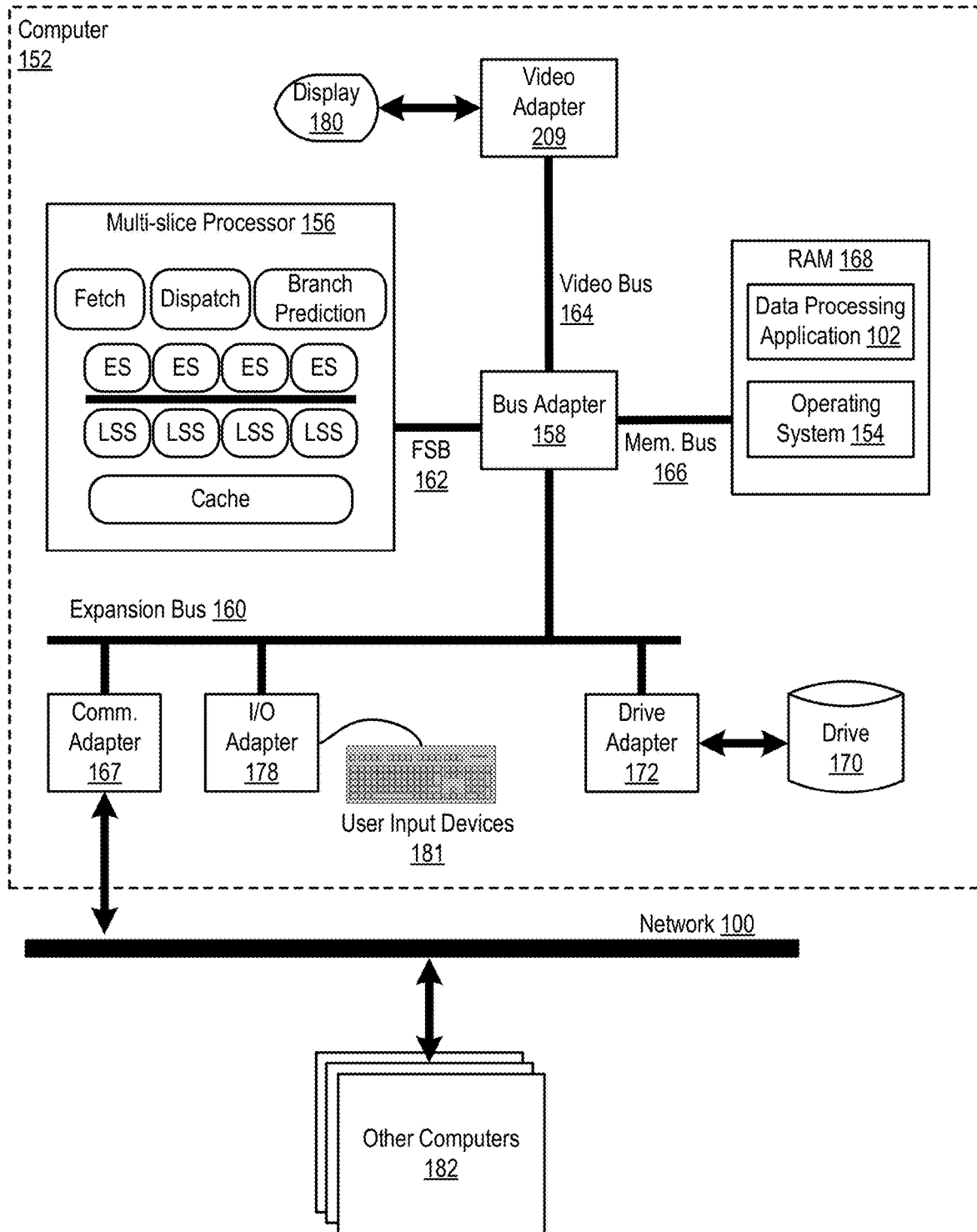
FIG. 1 sets forth a block diagram of an example system configured for instruction prefetching in a computer processor according to embodiments of the present invention.

Exemplary methods and apparatus for instruction prefetching in a computer processor in accordance with the present invention are described with reference to the accompanying drawings, beginning with FIG. 1. FIG. 1 sets forth a block diagram of an example system configured for instruction prefetching in a computer processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS'). Each execution slice may be configured to provide components that support execution of instructions: an issue queue, general purpose registers, a history buffer, an arithmetic logic unit (212) (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
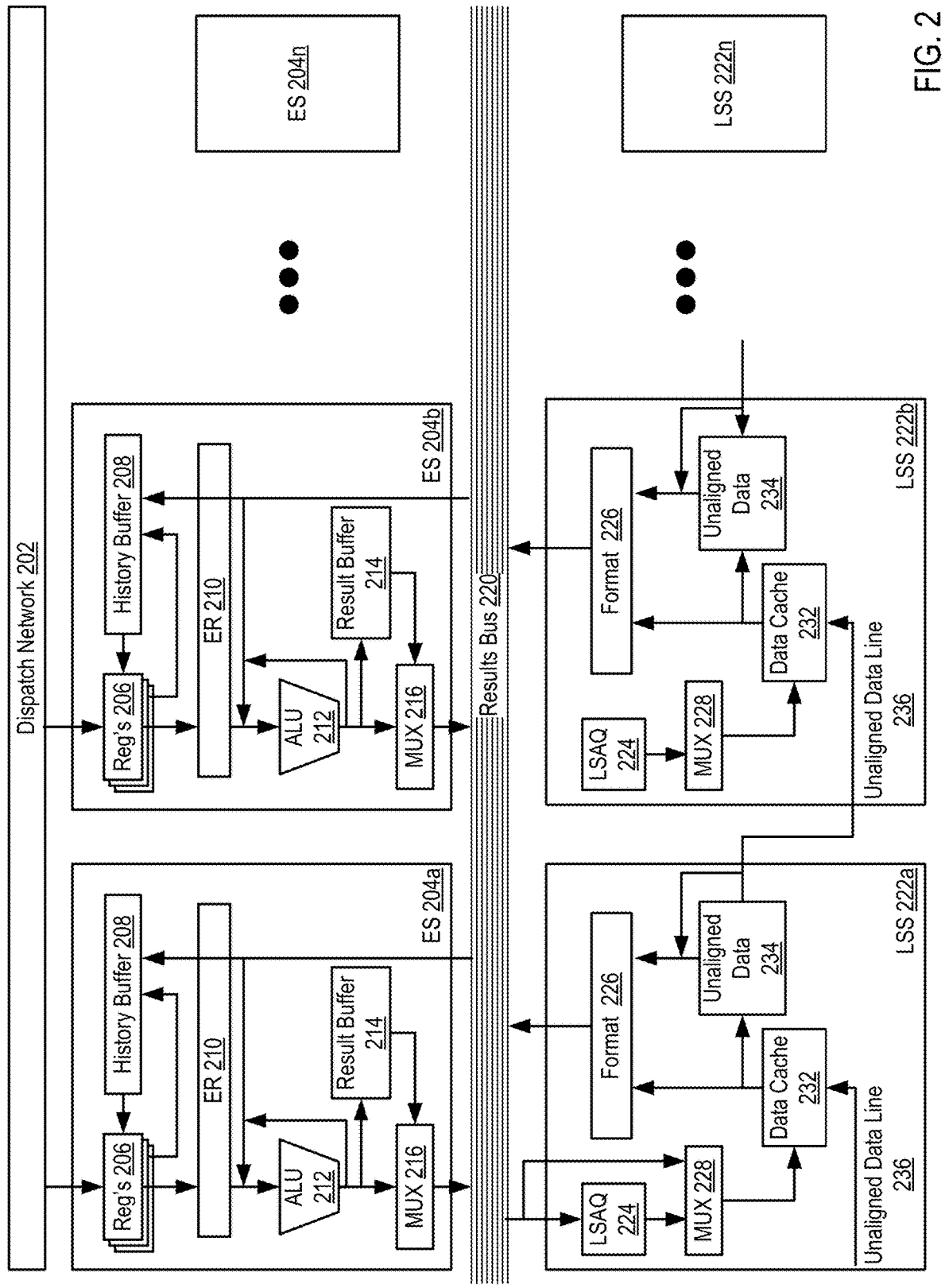
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction targeting a particular logical register and the result of the execution of the instruction. A logical register is an abstraction of an architectural register that enables out-of-order execution of instructions that target the same architectural register.

When a younger instruction targeting the same particular logical register is received, the entry in the general purpose register is moved to the history buffer. The history buffer (208) may be configured to store many identifiers of instructions targeting the same logical register. That is, the general purpose register is generally configured to store a single, youngest instruction identifier for each logical register while the history buffer may store many identifiers of non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit (212) or to a load slice (222a-222n) via the results bus (220).

The arithmetic logic unit depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus may be configured in a variety of manners and be composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), unaligned data logic (234) and formatting logic (226). The queue receives load and store operations to be carried out by the load/store slice (222).

The unaligned data logic (234) of each slice is coupled to the unaligned data logic of another slice through the unaligned data line (236). The unaligned data logic (234) enables data to be stored and retrieved across multiple load/store slices. The formatting logic (226) formats data into a form that may be returned on the results bus (220) to an execution slice as a result of a load instruction.

Figure 3:
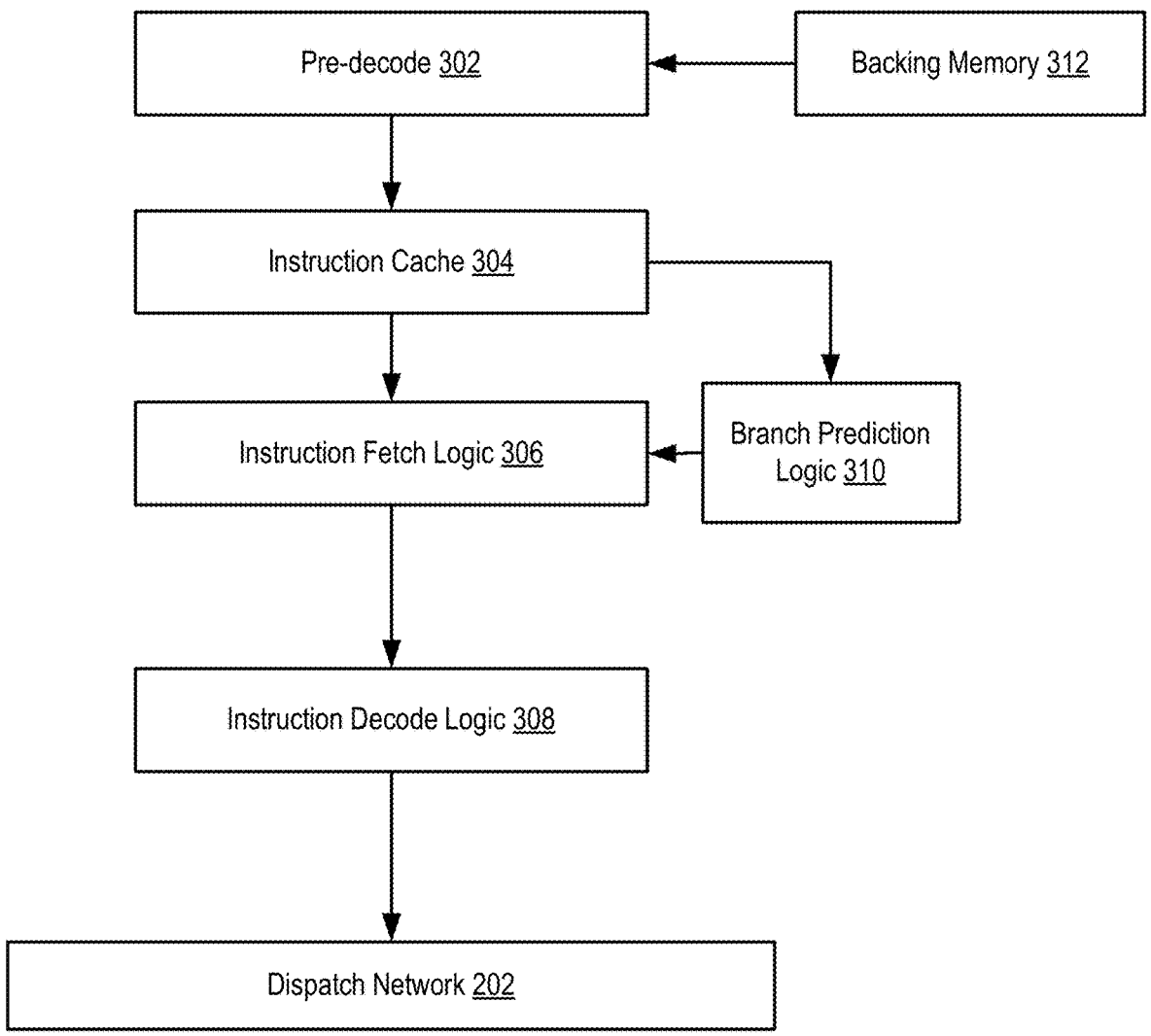
FIG. 3 sets forth a block diagram of another portion of a multi-slice processor according to embodiments of the present invention.

For further explanation, FIG. 3 sets forth a block diagram of another portion of a multi-slice processor according to embodiments of the present invention. The example multi-slice processor of FIG. 3 includes pre-decode logic (302) configured to retrieve instructions from backing memory (312), perform a preliminary decode of the instruction and store the pre-decoded instruction into an instruction cache (304).

The example multi-slice processor of FIG. 3 also includes branch prediction logic (310). Branch prediction logic generally performs branch prediction for pre-decoded instructions and tracks various branch prediction statistics for executing and executed instructions. The branch prediction logic (310) may include or access various registers and storage that contain such branch prediction statistics. Examples of storage entities may include global branch history tables and the like.

The example multi-slice processor of FIG. 3 also includes an instruction fetch unit (306). An instruction fetch unit (306) generally retrieves instructions from the instruction cache and provides the fetched instruction to instruction decode logic (308).

The example instruction decode logic (308) of FIG. 3 performs a final decode operation on the fetched instructions and provides the decoded instructions to the dispatch network (202). The dispatch network as described above, dispatches the decoded instructions among slices.

Prefetching an instruction in a computer processor such as the multi-slice processors of FIG. 2 and FIG. 3 includes retrieving multiple instructions from backing memory when there is a miss in an instruction cache for a particular instruction. That is, rather than merely retrieving a cache line from backing memory that includes the instruction that caused the miss in the instruction cache, a system configured for prefetching will retrieve the cache line that includes the instruction that caused the miss as well as additional cache lines. It is likely that once the instruction that caused the miss in the instruction cache is executed additional 'nearby' instructions will also be executed. Thus, fetching some instructions into the instruction cache in addition to the instruction that caused the miss, may reduce additional future misses in the instruction cache. In some processors of the prior art, for example, prefetching is carried out by retrieving the next n number of cache lines (or instructions), such as the next seven cache lines. While this was an improvement over no prefetching at all, the accuracy of such prefetching may still be improved upon; this method may cause cache pollution by prefetching lines that are not used which may displace useful lines that are used in the instruction cache, and increasing memory bandwidth requirements.

Figure 4:
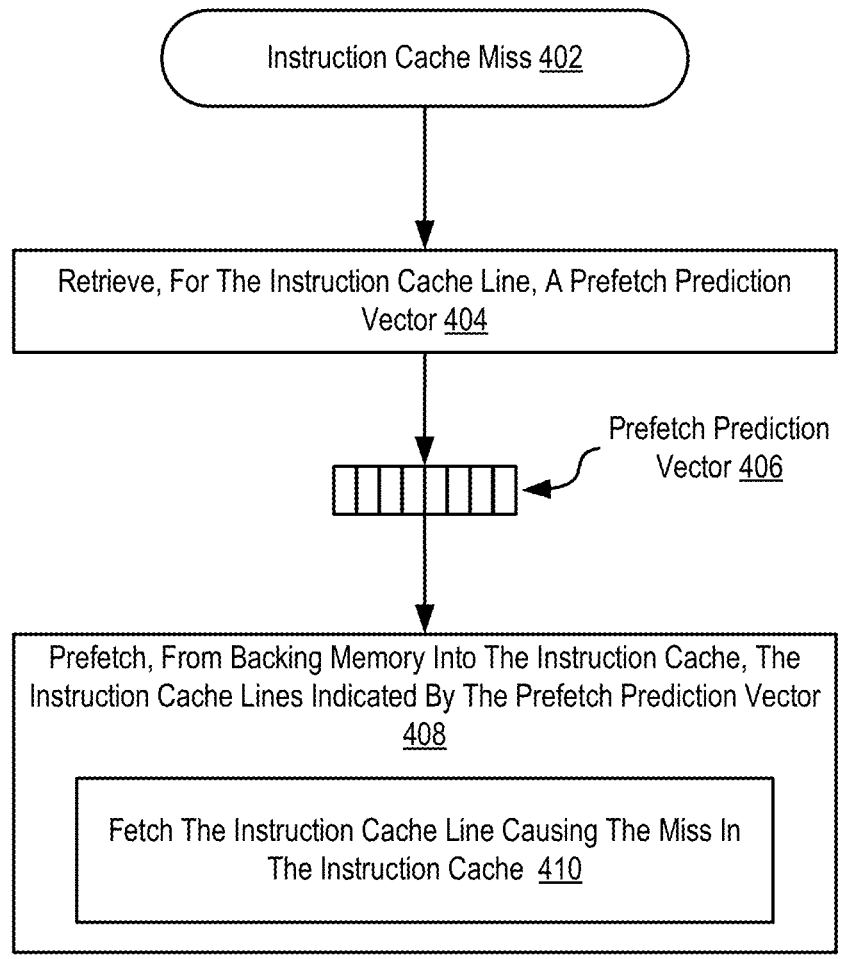
FIG. 4 sets forth a method of prefetching instructions in a computer processor.

To that end, the method of FIG. 4 sets forth a method of prefetching instructions in a computer processor. Upon a miss (402) in an instruction cache for an instruction cache line, the method of FIG. 4 includes retrieving (404), for the instruction cache line, a prefetch prediction vector (406). A prefetch prediction vector as the term is used in this specification represents one or more cache lines of a set of contiguous instruction cache lines following the instruction cache line that caused the miss (402). Those cache lines following the instruction cache line are to be prefetched from backing memory. The prefect prediction vector may be implemented in a variety of ways, such as, for example a bit string. The value of each bit in the string indicates whether a particular cache line is to be prefetched. With an instruction address at 0x80 for the instruction causing the miss in the instruction cache, cache lines of 128 bytes in length, and with a bit string 0100100, for example, the cache lines to be prefetched as indicated by the vector are 0x80+128*2 and 0x80+128*5, the two and five indicated by the element of the vector in which a flag is set (the bit value is 1). Essentially each element represents an additional line of cache to retrieve from backing memory if the value of the bit in the element is set to one. The address of each cache line to be retrieved may then be calculated as a combination of a base address (the address of the instruction that caused the miss (402) in the instruction cache) and an offset corresponding to the location of the element in the vector.

As described below in further detail, the prefetch prediction vector may maintained such that the values of elements of the vector represent cache lines including instructions most likely to be executed along with the instruction that caused the miss (402) in the instruction cache. That is, rather than merely retrieving the next n instructions for backing memory, the method of FIG. 4 enables the prefetch unit to prefetch the most likely instructions to be executed. As such, the accuracy of prefetching may be increased relative to a next n prefetch scheme.

The method of FIG. 4 also includes prefetching (408), from backing memory into the instruction cache, the instruction cache lines indicated by the prefetch prediction vector (406). Prefetching the instruction cache lines indicated by the prefetch prediction vector may be carried out by one or more memory read operations directed at backing memory utilizing address values calculated in dependence upon the elements of the prefetch prediction vector. In the method of FIG. 4, prefetching (408) the instruction cache lines indicated by the prefetch prediction vector (406) may also include fetching (410) the instruction cache line causing the miss in the instruction cache.

Figure 5:
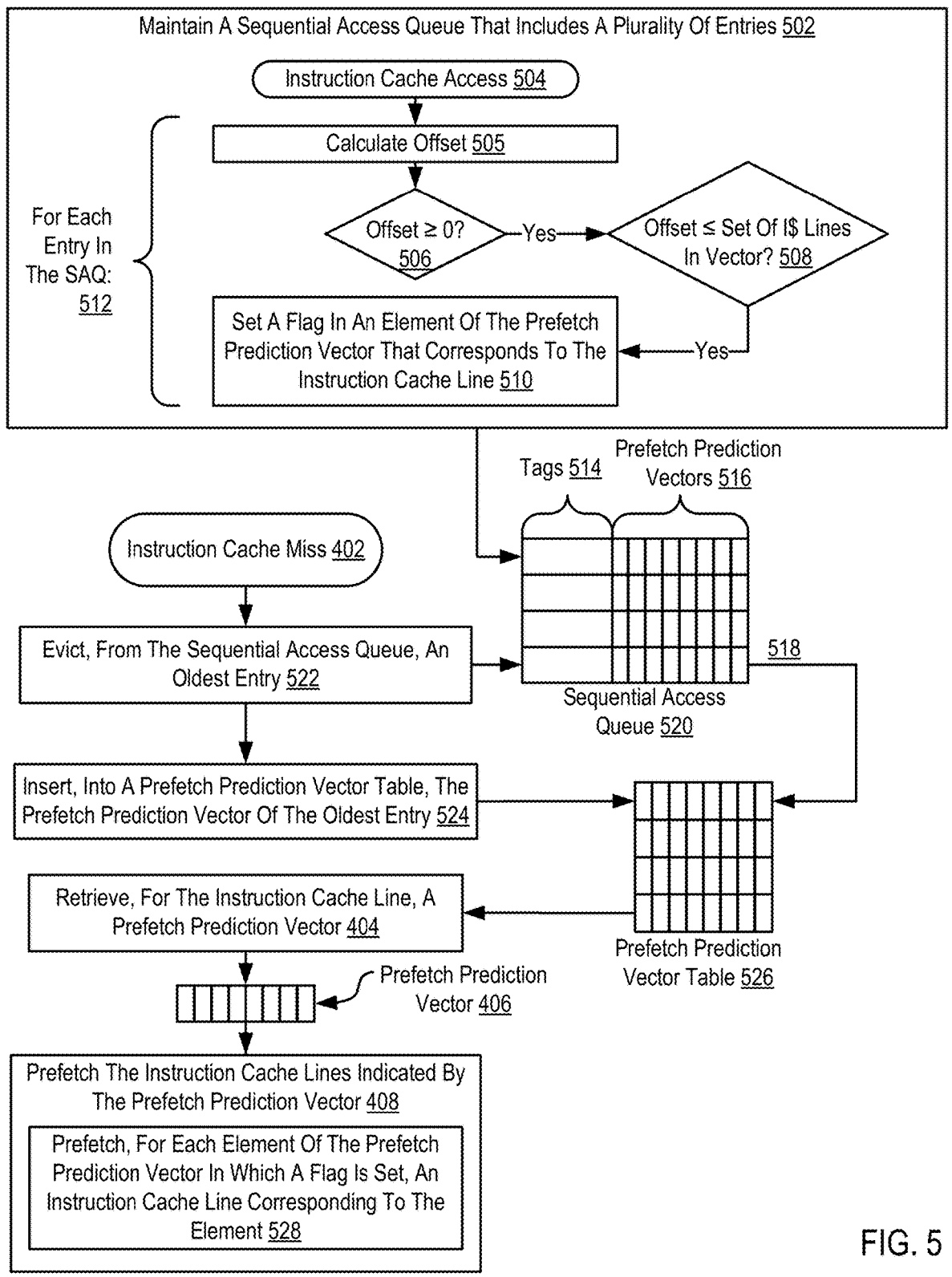
FIG. 5 sets forth a flow chart illustrating another example method for instruction prefetching in a computer processor according to embodiments of the present invention.

For further explanation, FIG. 5 sets forth a flow chart illustrating another example method for instruction prefetching in a computer processor according to embodiments of the present invention. The method of FIG. 5 is similar to the method of FIG. 4 in that the method of FIG. 5 also includes retrieving (404), for the instruction cache line, a prefetch prediction vector (406); and prefetching (408), from backing memory into the instruction cache, the instruction cache lines indicated by the prefetch prediction vector.

The method of FIG. 5 differs from the method of FIG. 4, however, in that the method of FIG. 5 includes maintaining (502) a sequential access queue (520). The sequential access queue includes a plurality of entries, with each entry including a tag (514) and a prefetch prediction vector (516). The tag (514) represents an instruction cache line that, upon a prior access of the instruction cache, resulted in a miss in the instruction cache. In the method of FIG. 5 maintaining (502) the sequential access queue (520) may include, upon a received access request (504) for an instruction cache line and for each entry in the sequential access queue: calculating (505) an offset as an address for the instruction cache line less the value of the tag in the entry of the sequential access queue.

The method of FIG. 5 continues by determining (506) whether the offset matches or exceeds zero. If the offset does not match or exceed zero, the instruction cache line presently accessed (504) is a cache line prior to the cache lines represented by the prefetch prediction vector (516) of the element of the sequential access queue. In such a case, the entry of the SAQ is not updated. If, however, the offset does match or exceed zero, the method of FIG. 5 continues by determining (508) whether the offset does not exceed addresses for the set of contiguous instruction cache lines represented by the prefetch prediction vector. In a system in which the prefetch prediction vector comprises eight elements and each instruction cache line is 128 bytes in length, for example, each vector represents a range of addresses beginning at the address for the instruction represented by the tag and ending 1024 bytes after the instruction address. If the address of instruction accessed (504) in the instruction cache less the tag matches or exceeds zero, the instruction is at a cache line past the base address of the element of the sequential access queue. If the address of instruction accessed (504) in the instruction cache less the tag is less than or equal to the greatest address of the cache lines represented by the prefetch prediction vector in the element of the sequential access queue, the address points to a cache line within the range of cache lines represented by prefetch prediction vector of the element of the sequential access queue.

To that end, the method of FIG. 4 continues by setting (510) a flag in the element of the prefetch prediction vector that corresponds to the instruction cache line. In this way, accesses to a cache line are tracked relative to addresses of other cache lines in the prefetch prediction vector. Accesses of cache lines that are also 'near' a particular cache line in memory are indicated by a flag in an element of the prefetch prediction vector for that particular cache line.

The steps of calculating (505) an offset, determining (506) whether the offset meets or exceeds zero, determining whether the offset is less than or equal to the addresses represented by the set of instruction cache lines in the element of the sequential access queue, and setting (510) a flag in an element of the prefetch prediction vector that corresponds to the instruction cache line accessed (504), may be carried out (512) for each entry in the sequential access queue upon each instruction cache access. That is, upon a single access to the instruction cache, the method of FIG. 4 may process every sequential access queue element, updating the prefetch prediction vector of each element accordingly.

Upon an access request for an instruction cache line that results in an instruction cache miss, the method of FIG. 5 continues by evicting (522), from the sequential access queue (520), an oldest entry (518) and inserting (524) the prefetch prediction vector of the oldest entry into a prefetch prediction vector table. In such an embodiment, retrieving (404) the prefetch prediction vector may be carried out by retrieving the prefetch prediction vector from the prefetch prediction vector table (526).

In such an embodiment, prefetching (408), from backing memory into the instruction cache, the instruction cache lines indicated by the prefetch prediction vector may be carried out by prefetching (528), for each element of the prefetch prediction vector in which a flag is set, an instruction cache line corresponding to the element.

Figure 6:
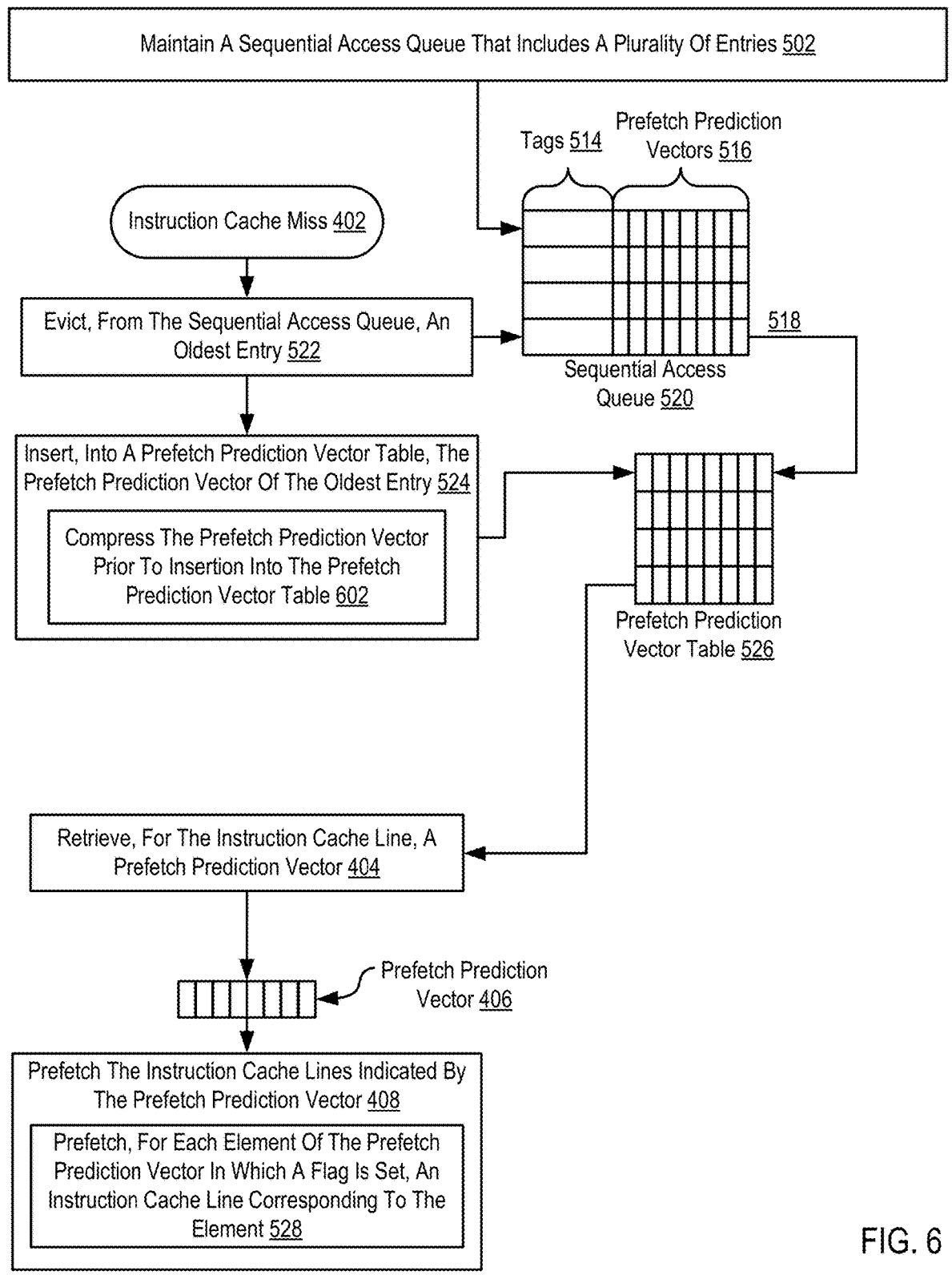
FIG. 6 sets forth a flow chart illustrating another example method for instruction prefetching in a computer processor according to embodiments of the present invention.

For further explanation, FIG. 6 sets forth a flow chart illustrating another example method for instruction prefetching in a computer processor according to embodiments of the present invention. The method of FIG. 6 is similar to the method of FIG. 5 in that the method of FIG. 6 also includes maintaining (502) a sequential access queue, evicting an oldest entry of the sequential access queue upon an instruction cache miss (402), inserting (524) the prefetch prediction vector of the oldest entry of the sequential access queue into a prefetch prediction table; retrieving (404), for the instruction cache line, a prefetch prediction vector (406); and prefetching (408), from backing memory into the instruction cache, the instruction cache lines indicated by the prefetch prediction vector.

The method of FIG. 6 differs from the method of FIG. 5, however, in in the method of FIG. 5 inserting (524), into a prefetch prediction vector table, the prefetch prediction vector of the oldest entry includes compressing (602) the prefetch prediction vector prior to insertion into the prefetch prediction vector table. The prefetch prediction vector in some embodiments may include one element for each cache line represented by the vector. For 8 cache lines, the vector may be 8 bits in length. Compressing the prefetch prediction vector may result in a reduced prefetch prediction vector table, reducing memory consumption in the processor.

The prefetch prediction vector may be compressed in a variety of manners as will occur to readers of skill in the art. In one example, the vector may be compressed in a determining from the vector the number of the next cache lines to prefetch from backing memory and storing that number, rather than the entire vector, in the prefetch prediction vector table (526). For example, a vector having the value of 01110000 may represent that the next three cache lines are to be prefetched from backing memory. Rather than storing an 8 bit vector to represent the next three cache lines, the method of FIG. 6 may include compressing the vector into a binary value of three—011—and storing that in the prefetch prediction vector. The compression need not be exact. For example, a vector having the value 01101100, indicates that the next cache line, the second cache line, the fourth and fifth cache lines are to be prefetched. However, vector may be compressed to represent that the next five cache lines are to be prefetched. To reduce such inaccuracies, the compression algorithm applied may include various exceptions. Consider, for example, a prefetch prediction vector of 01000011. Such a vector may represent that the next cache line, sixth cache line, and seventh cache line are to be prefetched. Rather than compressing the vector to represent that the next seven cache lines are to be retrieved, the system may revert to a standard prefetching scheme.

Figure 7:
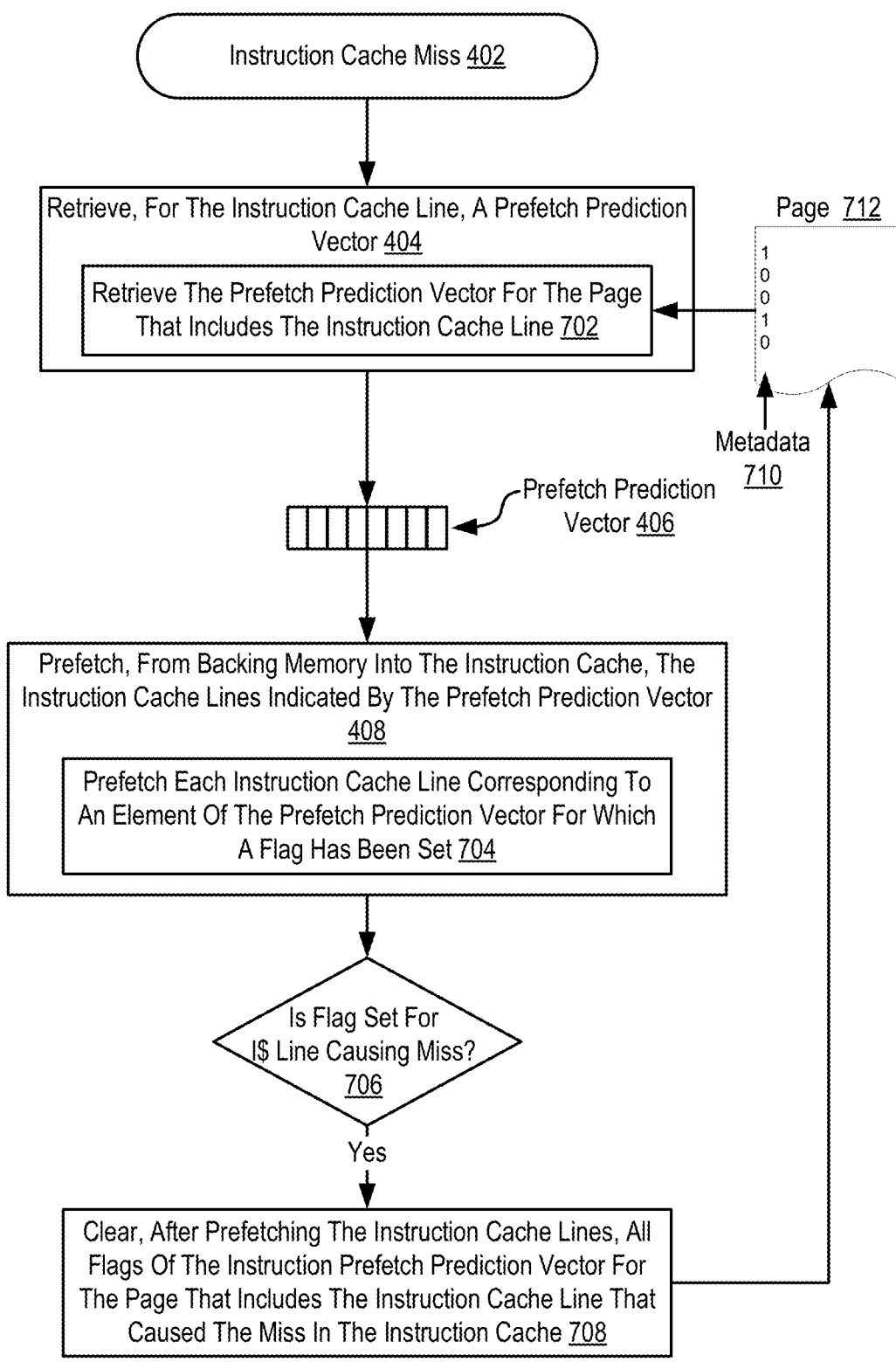
FIG. 7 sets forth a flow chart illustrating another example method for instruction prefetching in a computer processor according to embodiments of the present invention.

For further explanation, FIG. 7 sets forth a flow chart illustrating another example method for instruction prefetching in a computer processor according to embodiments of the present invention. The method of FIG. 7 is similar to the method of FIG. 4 in that the method of FIG. 7 also includes retrieving (404), for the instruction cache line, a prefetch prediction vector (406); and prefetching (408), from backing memory into the instruction cache, the instruction cache lines indicated by the prefetch prediction vector.

The sequential access queue and prefetch prediction table set forth in FIGS. 5 and 6 are one example implementation of a prefetch prediction vector. Readers will recognize, however, that other manners of maintaining such a prefetch prediction vector for later use in predicting instructions to prefetch may be implemented. The method of FIG. 7, to that end, differs from the method of FIG. 4 in that in the method of FIG. 7, instruction memory is segmented into pages (712) and each page includes a plurality of instruction cache lines. Each page may be associated with page metadata (710) describing the page. The page metadata may be included in the page or as a data structure separate from the page. The page metadata (710) in the example of FIG. 7 includes a prefetch prediction vector (406). The prefetch prediction vector includes a number of elements with each element corresponding to one of the plurality of instruction cache lines included in the page. That is, each page effectively includes a prefetch prediction vector with elements corresponding to each of the instruction cache lines included in the page of memory. In some embodiments, for example, a page of memory may include 32 cache lines. As such, each prefetch prediction vector may be implemented as a bit string 32 bits in length.

The metadata (710) including the prefetch prediction vector may be maintained regularly, upon each access to an instruction cache line. Upon each such access, a flag may be set, in the prefetch prediction vector of the page that includes the accessed instruction cache line, in the element of the prefetch prediction vector corresponding to the instruction cache line.

To that end, retrieving (404) a prefetch prediction vector for an instruction cache line causing a cache miss (402) in the method of FIG. 7 is carried out by retrieving (702) the prefetch prediction vector for the page that includes the instruction cache line causing the cache miss and prefetching (408) the instruction cache lines indicated by the prefetch prediction vector is carried out by prefetching (704) each instruction cache line corresponding to an element of the prefetch prediction vector for which a flag has been set.

From time to time, the prefetch prediction vector must be cleared. To that end, the method of FIG. 7 also includes determining (706) whether a flag is set in the element corresponding to the instruction cache line that caused the miss in the instruction cache. If the flag is not set for the instruction cache line causing the miss (402), then no further action is taken on this particular instruction cache miss. If, however, the flag is set in the element corresponding to the instruction cache line that caused the miss in the instruction cache, the method of FIG. 7 continues by clearing (708), after prefetching the instruction cache lines represented by the prefetch prediction vector, all flags of the instruction prefetch prediction vector for the page that includes the instruction cache line that caused the miss in the instruction cache.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of instruction prefetching in a computer processor, the method comprising:
    upon a miss in an instruction cache for an instruction cache line:
    retrieving, for the instruction cache line, a prefetch prediction vector, the prefetch prediction vector representing one or more cache lines of a set of contiguous instruction cache lines following the instruction cache line to prefetch from backing memory;
    maintaining a sequential access queue comprising a plurality of entries, each entry including a prefetch prediction vector, wherein for each received access request for an instruction cache line and for each entry in the sequential access queue: if an offset for the requested instruction cache line matches or exceeds zero and the offset does not exceed addresses for the set of contiguous instruction cache lines represented by the prefetch prediction vector, setting a flag in the element of the prefetch prediction vector that corresponds to the instruction cache line; and
    prefetching, from the backing memory into the instruction cache, the instruction cache lines indicated by the prefetch prediction vector.

2. The method of claim 1 wherein prefetching the instruction cache lines indicated by the prefetch prediction vector further comprises fetching the instruction cache line causing the miss in the instruction cache.

3. The method of claim 1 further comprising:
    upon an access request for an instruction cache line resulting in an instruction cache miss:
    evicting, from the sequential access queue, an oldest entry; and
    inserting, into a prefetch prediction vector table, the prefetch prediction vector of the oldest entry; wherein:
    retrieving, for the instruction cache line, the prefetch prediction vector further comprises retrieving the prefetch prediction vector from the prefetch prediction vector table.

4. The method of claim 3 wherein:
    inserting, into a prefetch prediction vector table, the prefetch prediction vector of the oldest entry further comprises compressing the prefetch prediction vector prior to insertion into the prefetch prediction vector table.

5. The method of claim 1 further comprising:
    prefetching, from backing memory into the instruction cache, the instruction cache lines indicated by the prefetch prediction vector further comprises prefetching, for each element of the prefetch prediction vector in which a flag is set, an instruction cache line corresponding to the element.

6. The method of claim 1 wherein:
    instruction memory is segmented into pages, each page includes a plurality of instruction cache lines, each page is associated with page metadata describing the page, the page metadata comprises a prefetch prediction vector, the prefetch prediction vector comprising a number of elements with each element corresponding to one of the plurality of instruction cache lines included in the page;

retrieving, for the instruction cache line, a prefetch prediction vector, further comprises retrieving the prefetch prediction vector for the page that includes the instruction cache line; and prefetching the instruction cache lines indicated by the prefetch prediction vector further comprises prefetching each instruction cache line corresponding to an element of the prefetch prediction vector for which a flag has been set.

7. The method of claim 6 further comprising:

if a flag is set in the element corresponding to the instruction cache line that caused the miss in the instruction cache, clearing, after prefetching the instruction cache lines, all flags of the instruction prefetch prediction vector for the page that includes the instruction cache line that caused the miss in the instruction cache.

8. The method of claim 6 further comprising:

upon each access to an instruction cache line:

setting, in the prefetch prediction vector of the page that includes the instruction cache line, a flag in the element of the prefetch prediction vector corresponding to the instruction cache line.

9. An apparatus comprising a computer processor configured for instruction prefetching and computer memory operatively coupled to the computer processor, the computer memory including an instruction cache, backing memory, a sequential access queue, and a prefetch prediction vector table, the computer processor configured to carry out:

upon a miss in the instruction cache for an instruction cache line:

retrieving, for the instruction cache line, a prefetch prediction vector, the prefetch prediction vector representing one or more cache lines of a set of contiguous instruction cache lines following the instruction cache line to prefetch from the backing memory;

maintaining the sequential access queue comprising a plurality of entries, each entry including a prefetch prediction vector, wherein for each received access request for an instruction cache line and for each entry in the sequential access queue: if an offset for the requested instruction cache line matches or exceeds zero and the offset does not exceed addresses for the set of contiguous instruction cache lines represented by the prefetch prediction vector, setting a flag in the element of the prefetch prediction vector that corresponds to the instruction cache line; and prefetching, from the backing memory into the instruction cache, the instruction cache lines indicated by the prefetch prediction vector.

10. The apparatus of claim 9 wherein prefetching the instruction cache lines indicated by the prefetch prediction vector further comprises fetching the instruction cache line causing the miss in the instruction cache.

11. The apparatus of claim 9 wherein the computer processor is further configured to carry out:

upon an access request for an instruction cache line resulting in an instruction cache miss:

evicting, from the sequential access queue, an oldest entry; and inserting, into the prefetch prediction vector table, the prefetch prediction vector of the oldest entry; wherein:

retrieving, for the instruction cache line, the prefetch prediction vector further comprises retrieving the prefetch prediction vector from the prefetch prediction vector table.

12. The apparatus of claim 11 wherein:

inserting, into a prefetch prediction vector table, the prefetch prediction vector of the oldest entry further comprises compressing the prefetch prediction vector prior to insertion into the prefetch prediction vector table.

13. The apparatus of claim 9 wherein the computer processor is further configured to carry out:

prefetching, from backing memory into the instruction cache, the instruction cache lines indicated by the prefetch prediction vector further comprises prefetching, for each element of the prefetch prediction vector in which a flag is set, an instruction cache line corresponding to the element.

14. The apparatus of claim 9 wherein:

instruction memory is segmented into pages, each page includes a plurality of instruction cache lines, each page is associated with page metadata describing the page, the page metadata comprises a prefetch prediction vector, the prefetch prediction vector comprising a number of elements with each element corresponding to one of the plurality of instruction cache lines included in the page;

retrieving, for the instruction cache line, a prefetch prediction vector, further comprises retrieving the prefetch prediction vector for the page that includes the instruction cache line; and prefetching the instruction cache lines indicated by the prefetch prediction vector further comprises prefetching each instruction cache line corresponding to an element of the prefetch prediction vector for which a flag has been set.

15. The apparatus of claim 14 wherein the computer processor is further configured to carry out:

if a flag is set in the element corresponding to the instruction cache line that caused the miss in the instruction cache, clearing, after prefetching the instruction cache lines, all flags of the instruction prefetch prediction vector for the page that includes the instruction cache line that caused the miss in the instruction cache.

16. The apparatus of claim 14 wherein the computer processor is further configured to carry out:

upon each access to an instruction cache line:

setting, in the prefetch prediction vector of the page that includes the instruction cache line, a flag in the element of the prefetch prediction vector corresponding to the instruction cache line.

17. A computer processor configured for instruction prefetching and computer memory operatively coupled to the computer processor, the computer memory including an instruction cache, backing memory, a sequential access queue, and a prefetch prediction vector table, the computer processor configured to carry out:

upon a miss in the instruction cache for an instruction cache line:

retrieving, for the instruction cache line, a prefetch prediction vector, the prefetch prediction vector representing one or more cache lines of a set of contiguous instruction cache lines following the instruction cache line to prefetch from the backing memory;

maintaining the sequential access queue comprising a plurality of entries, each entry including a prefetch prediction vector, wherein for each received access request for an instruction cache line and for each entry in the sequential access queue: if an offset for the requested instruction cache line matches or exceeds zero and the offset does not exceed addresses for the set of contiguous instruction cache lines represented by the prefetch prediction vector, setting a flag in the element of the prefetch prediction vector that corresponds to the instruction cache line; and prefetching, from the backing memory into the instruction cache, the instruction cache lines indicated by the prefetch prediction vector.

18. The computer processor of claim 17 wherein prefetching the instruction cache lines indicated by the prefetch prediction vector further comprises fetching the instruction cache line causing the miss in the instruction cache.

* * * * *